United States Patent [19]
Long et al.

[11] Patent Number: 5,884,951
[45] Date of Patent: Mar. 23, 1999

[54] APPARATUS AND METHOD HAVING SHORT STROKE ARCUATE MOTION FOR GRASPING OBJECTS

[75] Inventors: Michael Long; Thomas W. Palone, both of Rochester; James A. White, Conesus, all of N.Y.

[73] Assignee: Eastman Kodak Company, Rochester, N.Y.

[21] Appl. No.: 865,794

[22] Filed: May 30, 1997

[51] Int. Cl.[6] .................................................... B25J 15/06
[52] U.S. Cl. ...................... 294/86.4; 294/64.1; 294/106; 294/902; 901/39
[58] Field of Search .................... 294/2, 64.1, 65, 294/86.4, 88, 93, 97, 106, 119.1, 902; 269/225, 227; 279/33, 34, 110, 117; 318/568.21, 685; 901/31–39, 49

[56] References Cited

U.S. PATENT DOCUMENTS

| | | |
|---|---|---|
| 4,365,920 | 12/1982 | Morgan .................................. 294/97 X |
| 4,529,237 | 7/1985 | Gupta et al. ............................ 294/86.4 |
| 4,598,942 | 7/1986 | Shum et al. . |
| 4,680,523 | 7/1987 | Goumas et al. . |
| 4,699,414 | 10/1987 | Jones . |
| 4,808,988 | 2/1989 | Pearson . |
| 4,828,276 | 5/1989 | Link et al. ........................... 294/106 X |
| 4,955,653 | 9/1990 | Beals . |
| 5,215,507 | 6/1993 | Bonig . |

Primary Examiner—Johnny D. Cherry
Attorney, Agent, or Firm—Clyde E. Bailey

[57] ABSTRACT

An apparatus and method having short stroke motion for gripping and releasing an object utilizes a programmable stepper motor for controlling various short stroke, generally arcuate motions of the gripper. Gears associated with each of the at least one gripper jaws supported on a carrier shaft engage a common ring gear that is driven by drive means including the stepper motor which imparts synchronous motion of the grippers for opening and closing about the object.

11 Claims, 4 Drawing Sheets

APPARATUS AND METHOD HAVING SHORT STROKE ARCUATE MOTION FOR GRASPING OBJECTS

FIELD OF THE INVENTION

The invention relates generally to robotic grippers, more particularly, the invention concerns programmable means of providing short stroke gripping and releasing motion for apparatus for grasping objects.

BACKGROUND OF THE INVENTION

Commercially available robotic grippers fall into two general categories characterized by the motion of the gripping jaws. In one category, the gripping jaws move parallel to one another. In another, the gripping jaws move through an angular displacement.

Parallel motion jaws have two distinct advantages over angular motion jaws in that the gripping force vectors intersect inside of the envelope of the jaws for any part within their gripping range of motion and therefore produce no force vector tending to eject the part from the jaws and second, the action of opening and closing the jaws introduces no component of motion to the gripped part in a direction toward or away from the body of the gripper.

The disadvantages of linear translation, parallel jaw motion grippers are that they have more moving parts, weigh more and have a smaller range of jaw motion than angular motion jaw grippers.

Typically, parallel jaw motion grippers have a total range of jaw motion which is only 5 to 25 percent of the diameter of the gripper body, so unless a very large, massive gripper is used, frequent gripper changes are needed in assembly operations involving multiple, different size parts. The time required to change grippers, the positional inaccuracies in mounting different grippers on the robot arm and the variations in jaw centering from one gripper to another all detract from the performance of the assembly cell. Oversize grippers compromise the load carrying capacity and dynamic response of the robot by their increased weight. They also develop considerable clamping forces which are difficult to repeatably control when handling delicate plastic parts. Control is further compromised by piston seal stiction in the pneumatic actuators for these grippers.

Moreover, current torque limitation of small stepping motors limits the grasping force for a jaw to be between 1 and 2 pounds. This restricts their use to grasping objects weighing less than 20 oz. which includes a great majority of the parts in portable modern electronic consumer products.

Planetary gear grippers sold by Techno Sommer Automatic offer a large range of parallel jaw motion in a small size gripper by actuating the jaws through arcs of circles to simultaneously converge or diverge. These grippers overcome most of the mass and force control limitations of linear motion parallel jaw grippers but the inability to control the position of the jaws other than being fully open or fully closed introduces other limitations.

All of the commercially available grippers are actuated through simple pneumatic actuators which allow only fully open or fully closed jaw positions. With this limitation, large range of motion grippers are disadvantaged in gripping parts which are small relative to their maximum jaw opening in that cycle time is wasted in waiting for the jaws to close a large distance and when acquiring and releasing a part, are likely to interfere with adjacent parts. This will often prevent part acquisition or will damage parts which have already been placed in an assembly. Manually adjustable stops are available for some actuators, but it is more practical to change grippers than to adjust the gripper travel while it is installed on the robot. A second problem with pneumatically actuated, long stroke grippers is that high jaw velocities result when the gripper is optimized for cycle time. This results in high impact forces between the jaws and the part being acquired and can lead to part damage and missed parts when the part rebounds off of the jaw.

Additional flexibility is afforded in being able to acquire parts which are presented on their sides or upside down relative to their desired orientation. The parts are brought into the desired orientation by adding a rotational capability to the gripping surfaces of the parallel jaw gripper where the axis of rotation of the part is parallel to the direction of jaw movement. Techno Sommer Automatic offers two jaw parallel jaw grippers with this feature but, once again, the same problem of manually adjustable but nonprogrammable motion renders these pneumatic devices less than suitable for flexible assembly.

In U.S. Pat. No. 4,598,942 to Shum et al, a gripper device is disclosed that uses a planetary gear driven by a D.C. motor for causing movement of the gripper fingers. A shortcoming of this device is that the movements of the fingers are not programmably displaceable for short stroke motions.

U.S. Pat. No. 5,215,507 to Bonig describes a gripper assembly in which a complex gearing arrangement driven by a hydraulic or electric motor is used to produce movement of the gripper fingers. The gripper assembly of Bonig lacks, among other features, an important programmable motor drive for producing short stoke linear motion.

Therefore, a need persists for flexible assembly apparatus and method having a universal gripper design capable of the following functions: acquiring, reorienting and releasing a wide range of part shapes and sizes; operating in confined spaces; automatically resizing its jaw opening to adapt to different size parts; controlling the gripping force exerted on the parts; and, reorienting overturned parts.

SUMMARY OF THE INVENTION

It is, therefore, an object of the present invention to provide a apparatus for gripping and releasing an object that utilizes programmable short stroke arcuate motions.

Still another object of the present invention to provide an apparatus that grasps and releases an object with controlled force.

Yet another object of the invention is an apparatus that can grasp and assemble a wide range of object or part sizes within minimum time constraints.

It is a feature of the present invention that drive means for the gripper includes a programmable, miniature stepper motor that delivers short stroke generally arcuate motion to the object engaging means that enable a wide range of jaw movements.

To accomplish these and other objects, there is provided, in one aspect of the invention, an apparatus for gripping and releasing an object which includes at least one object engaging means for engaging and then grasping the object. The object engaging means is arranged on a corresponding carrier shaft mounted for rotation in a frame. A carrier shaft is provided for supporting each object engaging means. At least one gear is arranged on the carrier shaft for engaging a common ring gear mounted in the frame. Drive means, preferably including a stepper motor, operably associated with the ring gear is provided for actuating the object engaging means to synchronously move with short range motion for opening and closing about the object.

In another aspect of the invention, a method of grasping an object with short stroke motion includes the steps of providing an object, such as miniature electronic or mechanical components, and providing an apparatus having short stroke, generally arcuate motion for grasping and releasing the object, as described above. The engaging means is then moved into a position within reach of the object. The object is then engaged by the engaging means and then subsequently securely grasped by engaging means for subsequent independent treatment.

Accordingly, it is an important advantageous effect of the present invention that an apparatus for grasping and releasing an object utilizes programmable means for controlling a wide range of short stroke, generally arcuate gripper movements which can be used for assembling objects or parts in very close proximity and objects or parts having widely disparate sizes and shapes for economical flexible automatic assembly.

BRIEF DESCRIPTION OF THE DRAWINGS

The above and other objects of the present invention will become apparent when taken in conjunction with the following description and drawings wherein identical reference numerals have been used, where possible, to designate identical elements that are common to the figures.

DETAILED DESCRIPTION OF THE INVENTION

Figure 2:
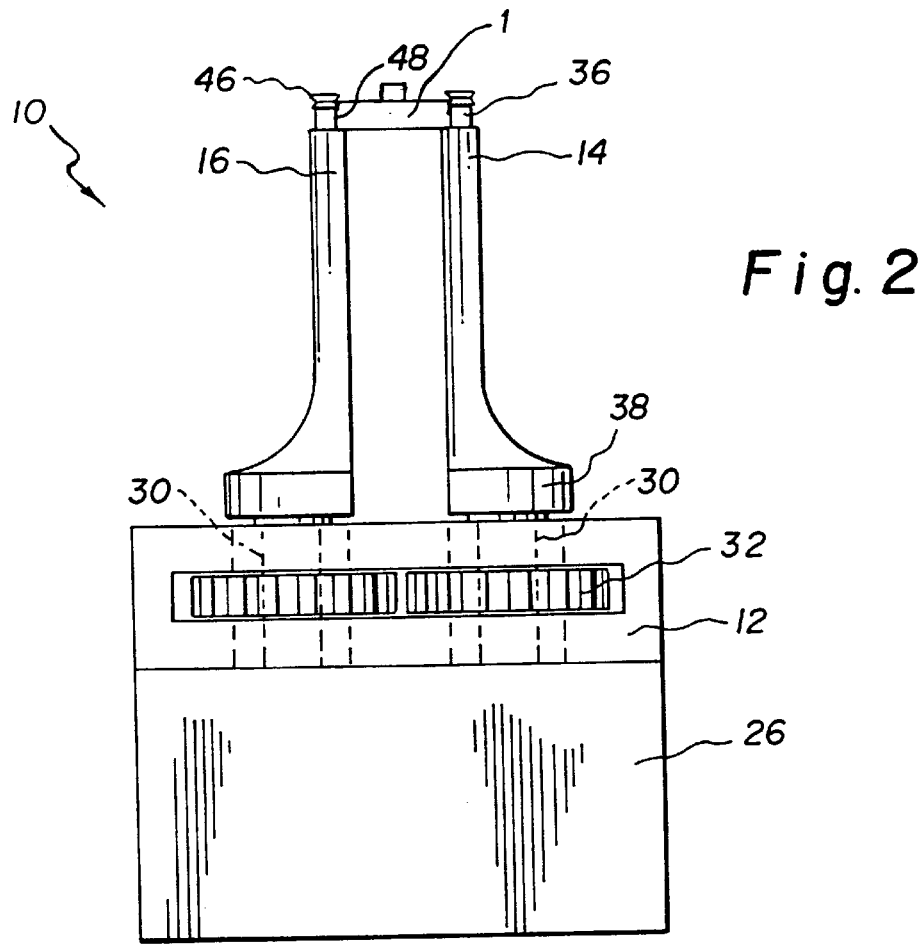
FIG. 2 is an elevation view of a planetary gear gripper driven through an offset output gear train.

Turning now to the drawings, and in particular to FIGS. 1–6, broadly defined, apparatus 10 has short stroke, generally arcuate motion for grasping objects or parts 1, such as miniature electronic components, typically in an assembly operation. Also referred to as a planetary gear gripper, apparatus 10 includes a frame 12 for supporting various elements, described below.

Referring to FIGS. 1–4, generally, apparatus 10 has at least one object engaging means, alternately referred to and illustrated as gripper members, 14, 16 for engaging and then grasping the object 1. Each of the object engaging means or gripper members, 14, 16 is arranged on a separate carrier shaft 30 and is independently mounted for rotation in the frame 12. The carrier shafts 30 comprise at least one gear 32 arranged thereon for engaging a common ring gear 34 rotatably mounted in the frame 12. The gripper members 14, 16 are actuated for synchronous movement for engaging an object 1 by a drive means 26 operably associated with the ring gear 34. In our invention drive means or stepper motor 26 is operably connected to the ring gear 34 through an offset gear train (not shown).

Figure 1:
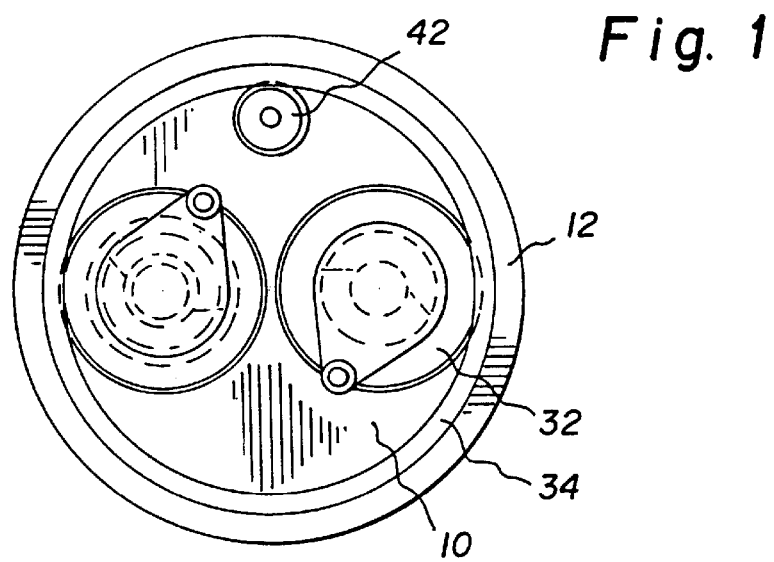
FIG. 1 is a plan view of a planetary gear gripper driven through an offset output gear train.
Figure 3:
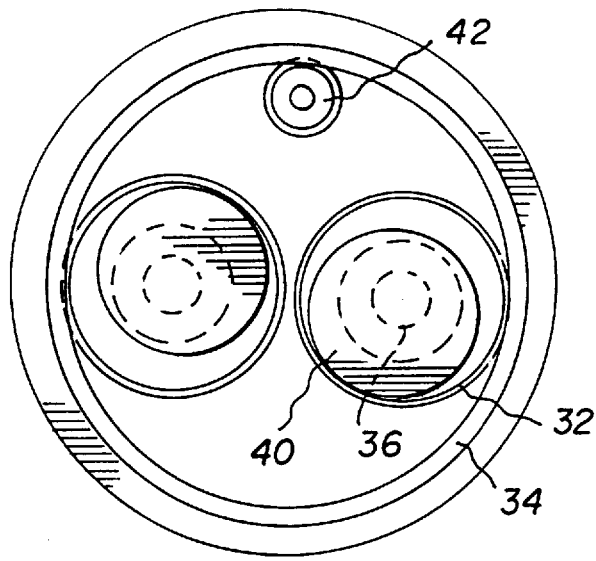
FIG. 3 is a plan view of an alternate arrangement planetary gear gripper driven through an offset output gear train.
Figure 4:
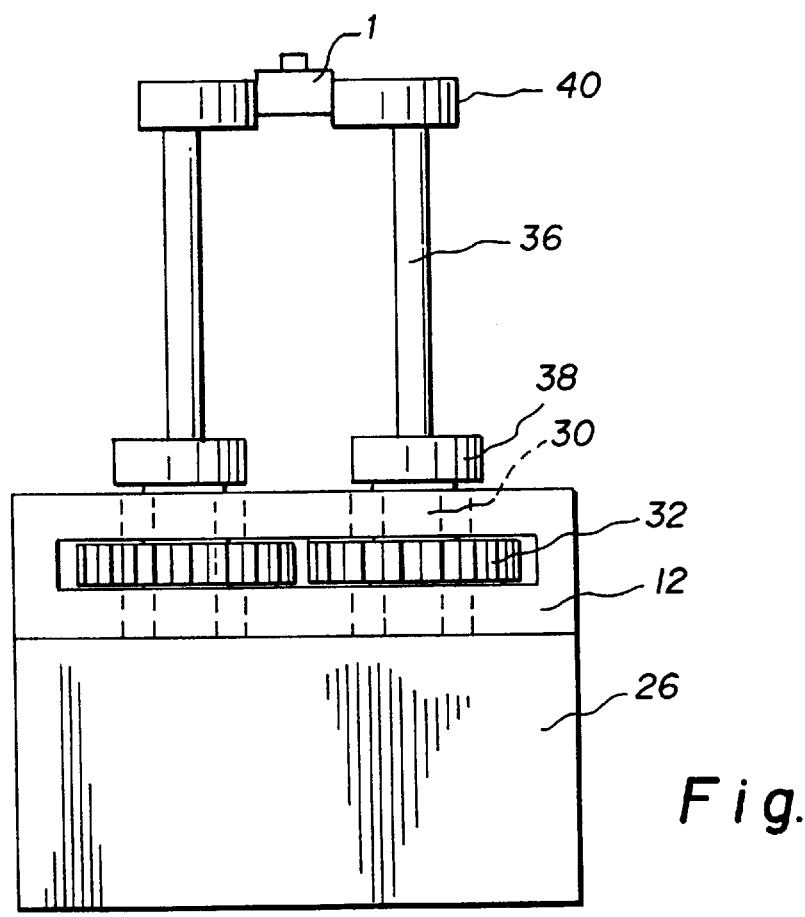
FIG. 4 is an elevation view of an alternate arrangement planetary gear gripper driven through an offset output gear train.

Referring to FIGS. 1–2, in a preferred embodiment of the invention, apparatus 10 includes preferably a pair of gripper members 14, 16, which take the form of a generally circular pin 36. In this embodiment of the invention, the circular pin 36 is eccentrically mounted on geared carrier shafts 30 through the use of preferably a permanent magnet 38. This mounting arrangement accounts, in part, for the generally arcuate movement of the gripper members 14, 16. Generally, circular pin 36 may also be concentrically mounted to carrier shaft 30 and include eccentric features 40 with which to grasp objects as shown in FIGS. 3 and 4. Gears 32 on each of these carrier shafts 30 engage a common ring gear 34. When the ring gear 34 is driven, each of the carrier shafts 30 bearing a respective gripper member 14, 16 rotates about its own axis (not shown) in the same direction as one another. Moreover, the gripper members 14, 16 move synchronistically with one another to cause the eccentrically mounted generally circular pin 36 in FIG. 1 to converge toward a central position or to separate to divergent positions.

Figure 5:
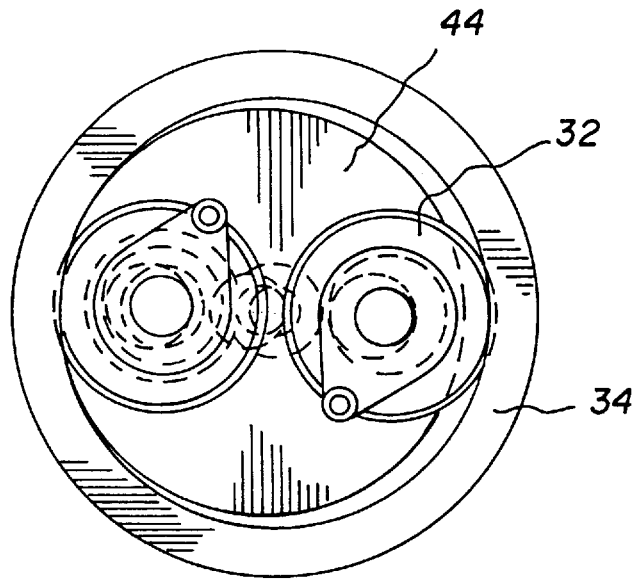
FIG. 5 is a plan view of a planetary gear gripper driven through a cycloidal gear train.
Figure 6:
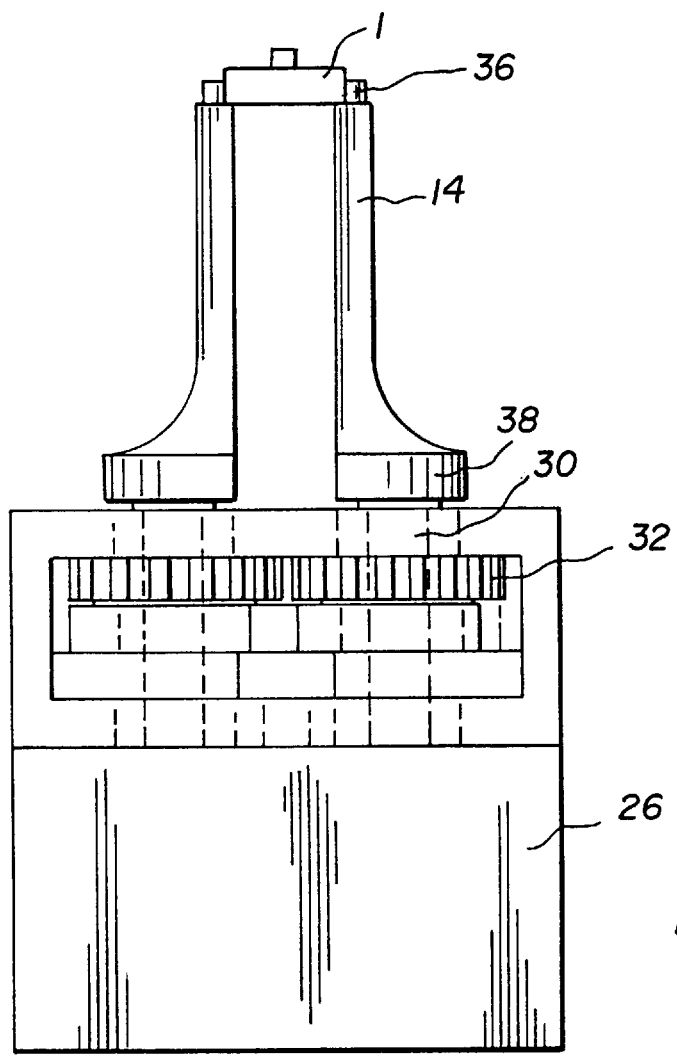
FIG. 6 is an elevation view of a planetary gear gripper driven though a cycloidal gear train.
Figure 7:
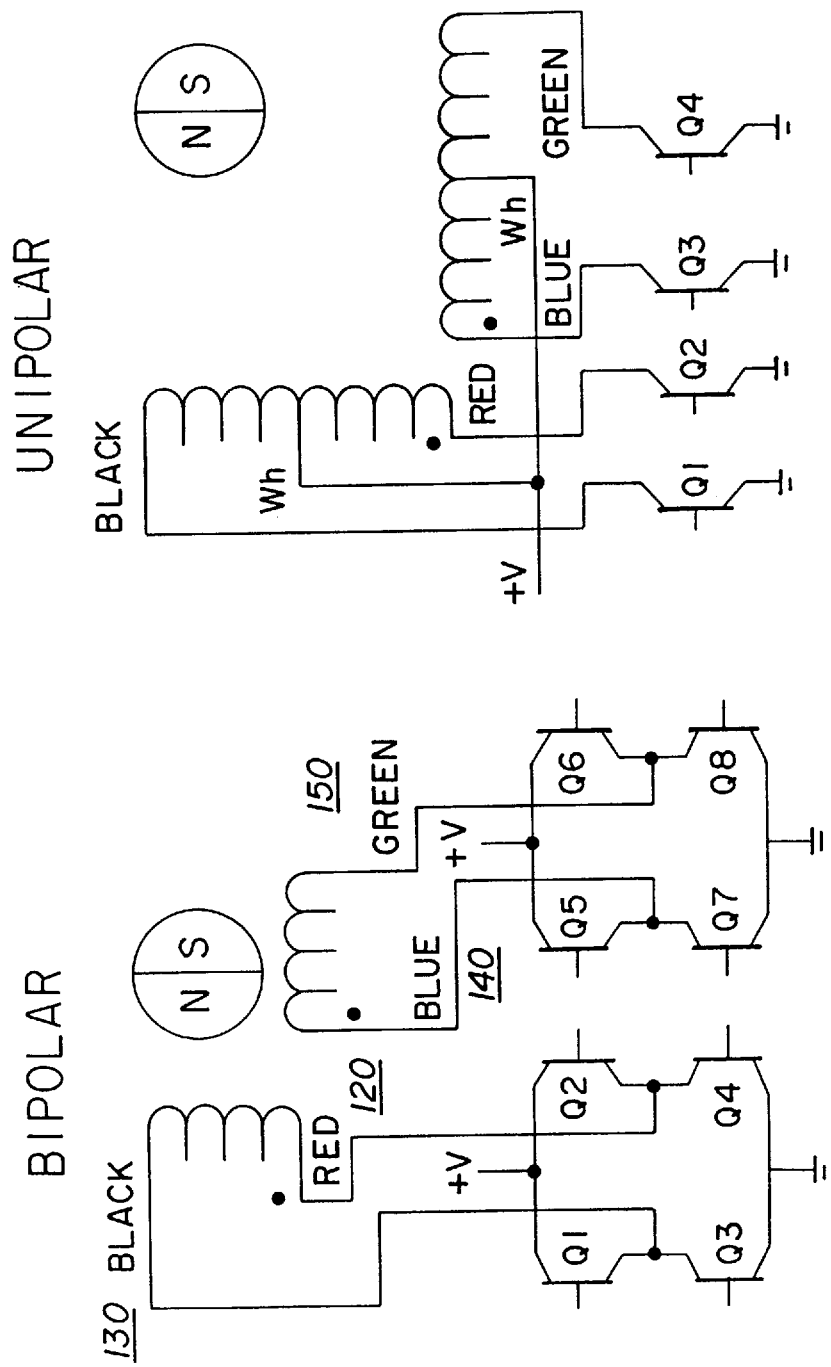
FIG. 7 is a typical motor pole actuation sequence for driving a stepper motor used in conjunction with the invention.

Referring to FIGS. 1, 2, and 5, 6, ring gear 34 is driven by a stepper motor 26, either through an offset output gear train 42 in FIGS. 1, 2 or through a cycloidal gear reducer 44 in FIGS. 5, 6. Generally, circular pins 36 may be equipped with vacuum cups 46 at their extremities 48 which then allow parts or objects 1 to be acquired through the use of vacuum as well as through frictional contact as described previously. In the case of vacuum acquisition, the movement of the gripper members 14, 16 serves to separate the individual vacuum cups 46 a distance suitable to the parts being acquired. The stepper motor 26 is driven according to a pulse train sequence which energizes various motor poles as shown in FIG. 7 to grasp or release an object. A typical pulse train sequence for clockwise rotation of the stepper motor 26 is represented in Table 1 below:

Referring to FIG. 7, miniature stepping motor 26 delivers programmable, short stroke arcuate movements of gripper members 14, 16. It is our experience that the generally arcuate movements of object engaging means or gripper members, 14, 16, fall anywhere within a wide range of possible movements of such gripper members 14, 16 of lightweight, large stroke, generally arcuate grippers. Stepping motors 26 used in our preferred embodiment also provide a means for controlling the force which the gripper members 14, 16 exert on the object 1, also called the clamping force. This is achieved by either controlling current to the stepper motor 26 or by providing mechanical elasticity in the gripper members 14, 16 in the direction of clamping force and controlling the position of the stepper motor 26. It is to be appreciated that the programmable motion gripper members 14, 16 of the invention, as described above, enable the use of a single gripper member to acquire and assemble a wide range of part or object sizes without the interference and time constraints of currently available pneumatically actuated grippers. In this embodiment, high energy density permanent magnets 38 are used to attach the gripper members 14, 16 to the apparatus 10. More particularly, at least one, but preferably two, object gripper member14, 16 is mounted to a respective carrier shaft 30 by permanent magnet 38 arranged between the carrier shaft 30 and the gripper member 14, 16. This provides distinct advantages over prior art gripper assemblies of the type disclosed, for instance, in U.S. Pat. Nos. 4,598,942 and 5,215,507, including: quick change gripper members 14, 16; and, overload protection in the event of a crash. Overload protection is required in the event that the gripper strikes a fixed object to protect both the gripper and the fixed object from permanent damage.

Referring again to FIG. 7, stepper motor 26 is driven according to a pulse train sequence which energizes various motor poles (not shown) to grasp or release an object 1. As an example, a typical pulse train sequence for clockwise rotation of the stepper motor is represented in Table 1 below from *HSI Inc. Stepper Motor Catalog (Haydon Switch and Instrument)*.

TABLE 1

|  | Bipolar | | | |
|---|---|---|---|---|
|  | $Q_2$–$Q_3$ | $Q_1$–$Q_4$ | $Q_6$–$Q_7$ | $Q_5$–$Q_8$ |
|  | Unipolar | | | |
| Step | $Q_1$ | $Q_2$ | $Q_3$ | $Q_4$ |
| 1 | ON | OFF | ON | OFF |
| 2 | OFF | ON | ON | OFF |
| 3 | OFF | ON | OFF | ON |
| 4 | ON | OFF | OFF | ON |
| 1 | ON | OFF | ON | OFF |

Thus, according to the example depicted in Table 1, switching transitors $Q_1$–$Q_8$ are either conducting (on) or nonconducting (off). For the bipolar drive, switching transitors $Q_2$ and $Q_3$ are conducting which drives the current from lead 120 to lead 130, shown in FIG. 7. $Q_1$ and $Q_4$ are nonconducting. $Q_6$ and $Q_7$ are conducting and drives current from lead 150 to lead 140 (FIG. 7). $Q_5$ and $Q_8$ are nonconducting. Hence, by changing the polarity of the motor stator coils (not shown) by changing the current flow direction through the stator coils, and thus their polarity, the magnetic field in the stator coils processes in a clockwise or counterclockwise direction. Moreover, the permanent magnet rotor of stepper motor 26 follows the processing magnetic field of the stator coils by virtue of magnetic attraction.

It is further to be appreciated that stepper motor drive 26 may be purposely overdriven to grasp an object 1 and then commanded to release the object 1 with a smaller motion index. The motion in this case will adapt to slightly different nominal object dimensions by losing command counts while grasping but will open to repeatable nominal opening dimension without cumulative error so long as the commanded grasping displacement is greater than both the minimum displacement required to grasp the object 1 and the commanded displacement to release the object 1.

In yet another embodiment of the invention, a method of gripping an object 1 with short stroke motion includes the steps of providing an object 1, such as miniature electronic components, and providing an apparatus 10 having short stroke generally arcuate motion for gripping and releasing the object 1, as described above. Synchronized gripper members 14, 16 are moved into a position within reach of the object 1. The object 1 is then engaged by gripping members 14, 16 and then subsequently securely grasped. After the object 1 is grasped securely by the gripper members 14, 16, the object 1 may be maneuvered from a first position at which the object 1 was securely grasped to a second position at which the object 1 is subjected to independent treatment, such as assemblying. After independent treatment, the object 1 may then be released from the gripper members 14, 16.

The invention has been described in detail with particular reference to certain preferred embodiments thereof, but it will be understood that variations and modifications can be effected within the spirit and scope of the invention.

PARTS LIST 1 object
10 apparatus
12 frame
14, 16 gripper members
26 stepper motor
30 carrier shaft
32 gears
34 common ring gear
36 circular pin
38 permanent magnet
40 eccentric features
42 gear train
44 cycloidal gear reducer
46 vacuum cups
48 extremities
120 lead
130 lead
140 lead
150 lead

What is claimed is:

1. Apparatus having short stroke arcuate motion for gripping and releasing an object, said apparatus comprising:

a frame;

at least one object engaging means for engaging and then gripping the object, each of said at least one object engaging means being arranged on a corresponding carrier shaft mounted for rotation in said frame, each of said corresponding carrier shafts having at least one gear arranged thereon for engaging a common ring gear rotatably mounted in the frame; and, drive means operably associated with said ring gear for actuating said object engaging means to synchronously move for engaging said object, said drive means comprising a stepper motor operably connected to said ring gear through an offset gear train, said stepper motor capable of being selectively overdriven to grip and release an object within a short motion range.

2. The apparatus recited in claim 1, wherein said object engaging means is mounted eccentrically on said carrier shaft for rotation in a substantially arcuate path about said frame.

3. The apparatus recited in claim 1, wherein said object engaging means includes an eccentric element mounted thereon for gripping said object, said object engaging means being concentrically mounted to said carrier shaft.

4. The apparatus recited in claim 1, wherein said stepper motor is programmably adapted to driving the object engaging means to reposition said at least one object engaging means for accommodating larger and smaller objects.

5. The apparatus recited in claim 1, wherein said at least one object engaging means comprises a generally circular pin.

6. The apparatus recited in claim 5, wherein said generally circular pin comprises a vacuum cup arranged on an end portion of said pin for engaging said object, said vacuum cup being supplied with vacuum from a vacuum generating means associated therewith.

7. The apparatus recited in claim 1, wherein said at least one object engaging means is mounted to said carrier shaft by a permanent magnet arranged between said carrier shaft and said object engaging means.

8. The apparatus recited in claim 1. wherein said stepper motor is operably connected to said ring gear through a cycloidal gear reducer.

9. The apparatus recited in claim 1, wherein each one of said corresponding carrier shafts rotate about a respective axis in synchronism with another of said carrier shafts.

10. Method of gripping an object with short stroke motion, comprising the steps of:

providing an object;

providing an apparatus having short stroke motion for gripping and releasing said object, said apparatus comprising a frame; at least one object engaging means for engaging and then gripping the object, each of said at least one object engaging means being arranged on a corresponding carrier shaft mounted for rotation in said frame, each of said corresponding carrier shafts having at least one gear arranged thereon for engaging a common ring gear rotatably mounted in the frame; and, drive means operably associated with said ring gear for actuating said object engaging means to synchronously move for engaging said object, said drive means comprising a stepper motor operably connected to said ring gear through an offset gear train, said stepper motor capable of being selectively overdriven to grip and release an object within a short motion range;

moving said engaging means within reach of said object;

engaging said object with said engaging means; and, securely grasping said object with said engaging means.

11. The method recited in claim 10, further comprising the step of maneuvering said object from a first position at which said object was securely gripped to a second position at which said object is subjected to independent treatment, and then releasing said object from said engaging means.

\* \* \* \* \*